Nov. 22, 1927.

M. SIZAIRE 1,650,544

VEHICLE WITH INDEPENDENT WHEELS

Filed July 19, 1926

Inventor:
M. Sizaire,

Patented Nov. 22, 1927.

1,650,544

UNITED STATES PATENT OFFICE.

MAURICE SIZAIRE, OF COURBEVOIE, FRANCE, ASSIGNOR TO SOCIETE DES AUTOMOBILES SIZAIRE, OF COURBEVOIE, FRANCE.

VEHICLE WITH INDEPENDENT WHEELS.

Application filed July 19, 1926, Serial No. 123,497, and in France February 6, 1926.

This invention has for its object improvements in automobile vehicles with independent wheels of the type disclosed in French specification No. 554,256 of November 26, 1921.

Vehicles of this type are characterized by their method of suspension and of attachment of the wheels to the chassis, without axle and without "bridge".

In this type of vehicle the device for the suspension and attachment of the wheels consists in a frame the smaller vertical sides of which are formed by arms integrally secured to the swivel axles or the members upon which the wheels are centered, one long horizontal side of which frame is a transverse spring and the other long side of which frame is formed in its central part by a cross member of the chassis and in its side portions by two pivoted arms which form two shock absorbing members.

This arrangement which forms an elastic and pivotally jointed frame enables the wheels to move vertically independently of each other. It represents in fact a beam of great depth the strength of which is at least equal to that of an ordinary axle or bridge and it presents the advantage that it comprises, on account of the structure, suspension shock absorbing members which in all other known methods of shock absorption consist of additional members.

In the device recalled above the shock absorbing arms, which form the lateral members of one of the horizontal sides of the frame for the suspension and attachment of the wheels, are necessarily of small length because they must be placed between the wheels and the end of the cross member of the chassis.

It may be necessary in certain cases to construct shock absorbing members of greater length and the present invention relates to an arrangement which enables this length to be increased.

Figure 1:
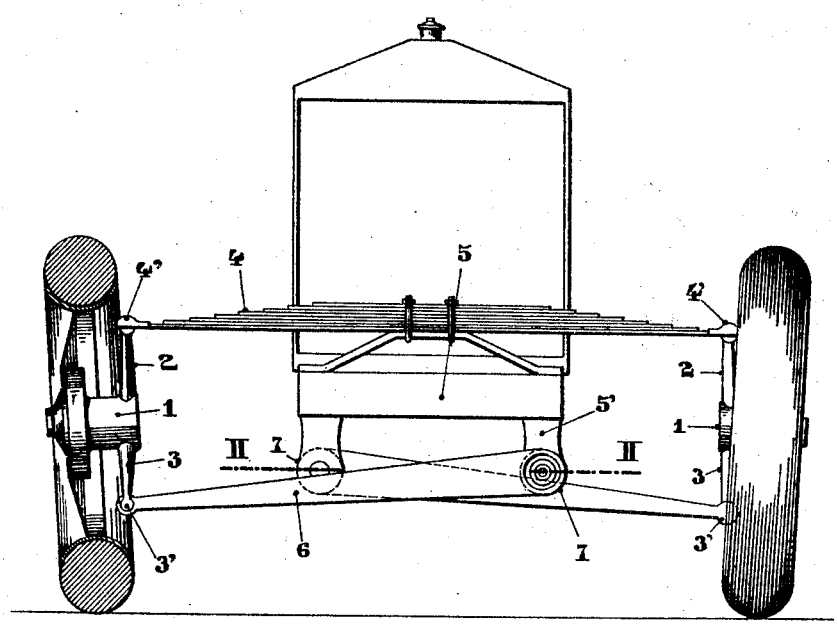

Figure 1 in the accompanying drawing illustrates diagrammatically a suspension frame device with independent wheels and with lengthened shock absorbing arms, according to the invention.

Figure 2:
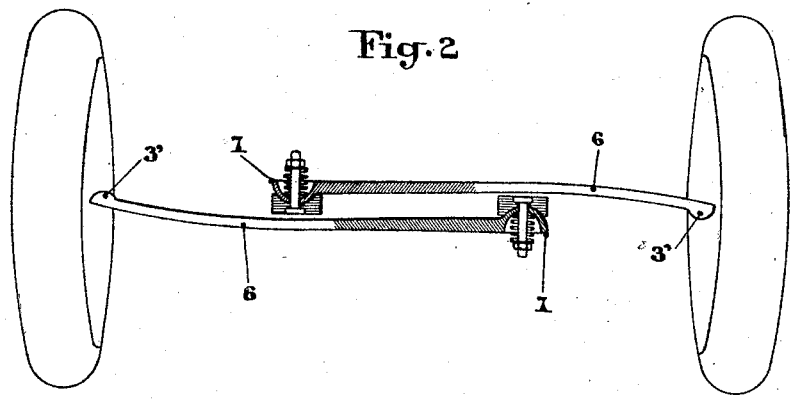

Figure 2 shows the arrangement of the shock absorbing arms diagrammatically in plan, in section taken along the line II—II in Figure 1.

The drawing illustrates the arrangement for a set of front wheels, but it is similar for a set of back driving wheels, the latter receiving the drive through any suitable transmission mechanism.

In the drawing 1 is the member by means of which the wheel is carried and centered and this member 1 is provided with two arms 2 and 3 which project above and below. The two arms 2 of the two members 1 are connected at 4'—4' to the ends of a transverse spring 4 attached at its centre to the chassis 5. The points of attachment 4' are formed by ball joints or any other suitable type of joint.

The lower arms 3—3 are connected by ball joints 3' or any other suitable type of joint to arms 6 connected pivotally at 7 to parts 5' of the chassis 5.

These arms 6 form shock absorbing members by their ends 7 suitably constructed to form a friction device with a member of corresponding form secured to the chassis, according to the usual arrangement in this type of the apparatus.

The arrangement of these friction members, either in the form of a spherical cap, as in the example shown in the drawing, or with conical surfaces, or with flat surfaces, may comprise modifications which are independent of the subject of the invention.

The shock absorbers may also be of the so-called hydraulic type, the friction members arranged at 7 being replaced by members actuated hydraulically and of known type.

In the example illustrated the shock absorbing members are disposed at the connection points 7 of the arms 6 with the chassis 5—5' but it is to be noted that they may also be fitted at the pivotal points 3'.

It is also to be noted that the shock absorbing devices may also be placed at the pivotal points 4' of connection of the ends of the spring 4. In this case the two sides of the spring itself will form the lever arms of the shock absorbers. With regard to the arms 6 these may then be simple connecting arms pivoted at 7 upon the chassis without shock absorbing devices. The shock absorbing devices might also be fitted at the points of pivotal connection 3' and 4' at the same time as at the points 7 and the shock absorbers at these three points to be given a varying size and adjustment.

Whatever be the type of shock absorber the arms 6 are of such a length that they cross so that the arm 6—7 connected to the right hand wheel is pivotally connected to the left hand side of the chassis and the arm 6—7 connected to the left hand wheel is pivotally connected to the right hand side of the chassis. This arrangement gives practically the longest length which can be obtained for the arms of the shock absorbers but these arms may be made shorter, while remaining longer than the length permitted by the device described in specification No. 554,256 mentioned above. The arms 6—7 may for example have a length such that they are joined by their ends 7 at the centre of cross member 5 of the chassis.

In the arrangement hereinbefore described the transverse spring 4 forms the top side of the suspension spring but it may also form the lower side, the shock absorbing arms then forming the top side.

What I claim:

1. In a spring suspension construction for automobiles a frame for the suspension of the vehicle and for the attachment of the wheels, composed of vertical arms integrally secured to the swivel axles for centering the wheels forms the shorter sides of said frame, a transverse spring forming one of the longer sides of said frame and two shock absorbing arms pivotally connected to the chassis and of length such that they form together when assembled one of the longer sides of the suspension frame, excluding the cross member of the chassis itself forming a part of the frame.

2. In a spring suspension construction for automobiles as claimed in claim 1, including shock absorbing devices at certain of the points of pivotal connection of the suspension frame.

In testimony whereof I have signed my name to this specification.

MAURICE SIZAIRE.